I. G. BOOTH.
CUSPADORE.

No. 176,734. Patented May 2, 1876.

Witnesses  Inventor
S. J. Van Stavoren  Isaac G. Booth
Jos. P. Connolly  By Connolly Bros
  Attorneys

UNITED STATES PATENT OFFICE.

ISAAC G. BOOTH, (GEORGE BOOTH, ADMINISTRATOR,) OF PHILADELPHIA, PENNSYLVANIA.

IMPROVEMENT IN CUSPADORES.

Specification forming part of Letters Patent No. 176,734, dated May 2, 1876; application filed April 23, 1875.

*To all whom it may concern:*

Be it known that I, ISAAC GEORGE BOOTH, of Philadelphia, in the county of Philadelphia and State of Pennsylvania, have invented certain new and useful Improvements in Cuspadores; and I do hereby declare the following to be a full, clear, and exact description of the invention, such as will enable others skilled in the art to which it pertains to make and use it, reference being had to the accompanying drawings, which form part of this specification, in which—

Figure 1:
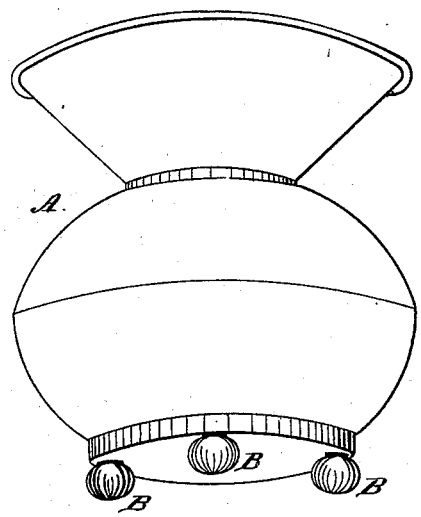
Figures 2, 3:
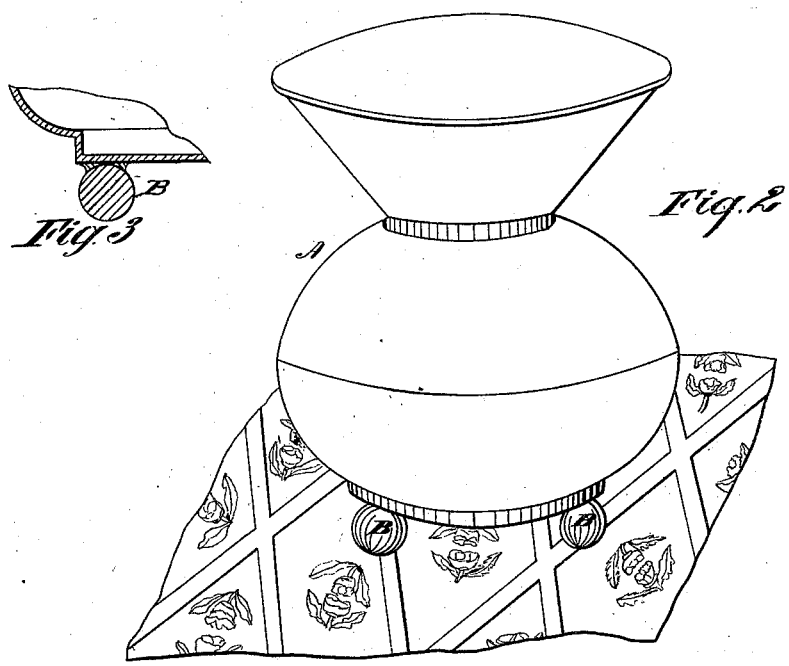

Figures 1 and 2 are perspectives of the invention; Fig. 3, a broken section.

The object of my invention is to make a "self-righting" cuspadore of a single shell of spun or stamped sheet metal, of equal, or substantially equal, thickness throughout.

Heretofore self-righting cuspadores have been formed with a heavy base, produced generally, if not always, by forming a double bottom, or a bottom made of two shells, between which was a chamber, filled with some weighty substance to counterbalance the top.

This method is at once costly and troublesome; and to avoid the expense and labor of a construction of this character, and at the same time to furnish a more cleanly cuspadore, I form mine of a single shell, (divided into sections, if desired, as the neck, breast, body, and bottom,) of spun or stamped sheet metal. To the bottom of this single shell I affix three feet, of sufficient gravity to counterpoise the top, and cause the vessel to right itself automatically when upset. These feet, besides acting as a counterpoise, serve also to raise the cuspadore above the floor, and prevent the carpet from being soiled by the exudation or collection of moisture.

In the drawing, A shows the cuspadore, made of a single shell throughout; and B B B, the counterpoising feet, above described.

I am aware that non-righting spittoons, supplied with elevating-feet, have been already used; also, that a self-righting cuspadore, lacking feet and formed with a weighted bottom, has been also known and used.

What I claim as my invention is—

A self-righting cuspadore, formed of a single shell, of equal, or substantially equal, thickness throughout, and provided with counterpoising feet, substantially as shown and described.

In testimony that I claim the foregoing I have hereunto set my hand this 7th day of April, 1875.

ISAAC GEO. BOOTH.

Witnesses:
 THOS. A. CONNOLLY.
 CHAS. F. VAN HORN.